3,045,017
IMINODIBENZYL DERIVATIVES
Paul Gailliot, Paris, and Jacques Gaudechon, Thiais, France, assignors to Societe des Usines Chimiques Rhone-Poulenc, Paris, France, a corporation of France
No Drawing. Filed June 19, 1959, Ser. No. 821,386
Claims priority, application France June 27, 1958
6 Claims. (Cl. 260—268)

This invention relates to new derivatives of iminodibenzyl.

It is an object of the present invention to provide new iminodibenzyl derivatives which possess useful pharmacological properties. Further objects of the invention are to provide processes for their preparation, and pharmaceutical compositions containing them.

The iminodibenzyl derivatives of the present invention are those which conform to the general formula:

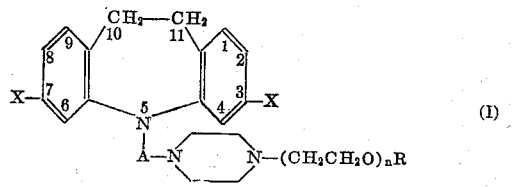
(I)

(wherein A represents a divalent straight or branched saturated aliphatic hydrocarbon group containing 2 to 4 carbon atoms with at least two carbon atoms between the nitrogen atom of the iminodibenzyl nucleus and that of the piperazine nucleus, the symbols X represent hydrogen atoms or identical halogen atoms, $n$ represents 1 or 2, R represents a hydrogen atom or a lower acyl group or a carbamoyl group which may be substituted on the nitrogen atom by one or two lower alkyl groups, and one or more of the carbon atoms of the piperazine nucleus may carry a lower alkyl group) and their acid addition and quaternary ammonium salts. The word "lower" as herein applied to "acyl" and "alkyl" groups means that the group in question contains not more than four carbon atoms. The hydrocarbon group A may be, for example, any of the following groups: —$(CH_2)_2$—,

—$CH_2$—$CH$—
      |
      $CH_3$

—$(CH_2)_3$—

—$CH$—$(CH_2)_2$—, —$CH_2$—$CH$—$CH_2$—
  |                       |
  $CH_3$                  $CH_3$

—$(CH_2)_4$—

These new iminodibenzyl compounds may be prepared by the application of known methods for the conversion of iminodibenzyl and its C-substituted products into the corresponding 5-aminoalkyl-iminodibenzyls. Such methods when so applied can be defined generically as comprising the interaction of an iminodibenzyl of the formula:

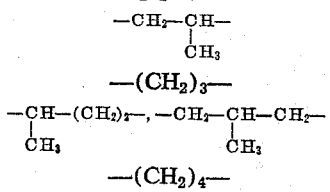
II with a compound Q, the group P and the compound Q being such that they will interact to introduce or form in the 5-position of the ring a substituent grouping of the structure:

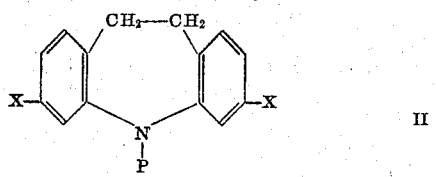
III (wherein the symbols A, X, $n$ and R are as hereinbefore defined and one or more of the carbon atoms of the piperazine nucleus may carry a lower alkyl group).

By the term "known methods" as used in this specification is meant methods heretofore employed or described in the chemical literature.

Preferred processes of manufacture are as follows:

(1) Interaction of an iminodibenzyl of the general formula:

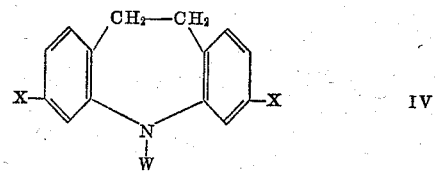
IV with a piperazine derivative of the general formula:

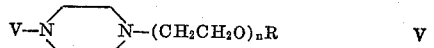
V wherein one of the groups W and V represents a hydrogen atom and the other a group —A—B, B representing the acid residue of a reactive ester, such as a halogen atom or a sulphuric or sulphonic ester residue, the other symbols are as hereinbefore defined, and one or more of the carbon atoms of the piperazine nucleus may carry a lower alkyl group.

The reaction may be effected with or without a solvent in the presence or absence of a condensing agent.

When W represents a hydrogen atom and V represents the group —A—B, it is advantageous to use a solvent of the group of aromatic hydrocarbons (for example, toluene or xylene), ethers (for example, diethyl ether) or tertiary amides (for example, dimethylformamide) in the presence of a condensing agent preferably of the class of alkali metals and their derivatives (such as, for example, hydrides, amides, hydroxides, alcoholates, metal alkyls or aryls) and, more particularly, metallic sodium or potassium, sodamide, powdered sodium or potassium hydroxide, lithium or sodium hydride, sodium tert-butoxide, butyllithium, phenyllithium or phenylsodium. The reaction is preferably carried out at the boiling temperature of the solvent. It is particularly advantageous to use a piperazinylalkyl halide in the form of the free base in solution in, for example, benzene, toluene, or xylene and to add it to the mixture of other reagents wherein the iminodibenzyl employed may already be present, in part at least, in the form of an alkali metal salt. The reaction may also be effected with a salt of the piperazinylalkyl halide but in this case a greater proportion of the condensing agent must be used in order to neutralise the acid of the salt employed.

In the case where the divalent aliphatic hydrocarbon group —A— is an asymmetric branched chain, such for example as

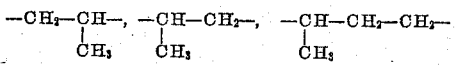

or

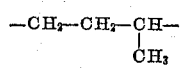

isomerisation can take place during the course of the reaction with the formation of a mixture of isomers. Separation of the isomers may be effected by, for example, fractional crystallisation of salts such as the hydrochlorides from a suitable solvent such as an alcohol.

When V represents a hydrogen atom and W represents the group —A—B, it is advantageous to carry out the reaction in an aromatic hydrocarbon or an alcohol solvent medium and to use as condensing agent an excess of the piperazine derivative.

(2) Interaction of an iminodibenzyl of the general formula:

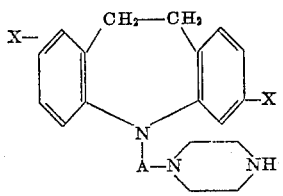

(wherein the symbols X and A are as hereinbefore defined and one or more of the carbon atoms of the piperazine nucleus may carry a lower alkyl group) with a reactive ester of the formula:

$$B-(CH_2CH_2O)_n-R \qquad VII$$

(wherein B, $n$ and R are as hereinbefore defined) or, in the case of compounds of general Formula I where R is a hydrogen atom and $n$ is 1, with ethylene oxide.

(3) In the case of compounds of general Formula I wherein R is an acyl group, acylation by known methods of alcohols corresponding to the general formula in which R is a hydrogen atom. The acylation may be effected, for example, by means of a halide, anhydride or ester of the appropriate acid.

(4) In the case of compounds of general Formula I wherein R is a carbamoyl or N-substituted carbamoyl group, conversion of an alcohol (or corresponding alcoholate) of the general formula:

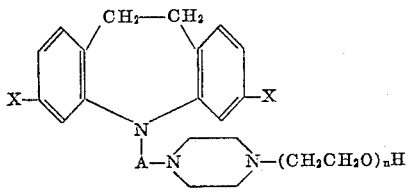

(wherein the symbols A, X and $n$ are as hereinbefore defined and one or more of the carbon atoms of the piperazine nucleus may carry a lower alkyl group) by known methods for converting the hydroxy group into a urethane grouping. The conversion of the hydroxy group into the urethane grouping may be effected by the action of isocyanic acid or an alkylisocyanate, the action of a carbamyl halide, the action of phosgene followed by ammonia or a primary or secondary amine, or the action of an N-bromoamide.

(5) Decomposition of an iminodibenzyl-5-carboxylate of the general formula:

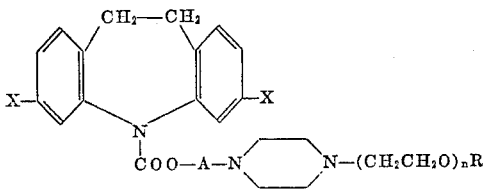

(wherein the various symbols are as hereinbefore defined and one or more of the carbon atoms of the piperazine nucleus may carry a lower alkyl group) by heating the carboxylate to a temperature above 100° C. and preferably between 150° and 220° C. until evolution of carbon dioxide ceases.

The reaction can be effected with the iminodibenzyl-5-carboxylate alone, i.e. without a diluent, or in an inert medium such as diphenyl, diphenyl oxide or a chlorinated aromatic hydrocarbon, for example, o-dichlorobenzene, or in such classical diluents for decarboxylation as, for example, quinoline or a weak base of high boiling point.

The iminodibenzyl-5-carboxylates of Formula IX may be obtained by known methods for the preparation of aminoalkyl iminodibenzyl-5-carboxylates, for example, by reaction of a halide (or an ester) of an iminodibenzyl-5-carboxylic acid upon a compound of the general formula:

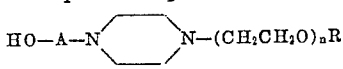

(wherein the various symbols are as hereinbefore defined and one or more of the carbon atoms of the piperazine nucleus may carry a lower alkyl group), or by reaction of a halogenoalkyl iminodibenzyl-5-carboxylate on the appropriately N-substituted piperazine.

The new iminodibenzyl derivatives of Formula I may be converted in manner known per se into acid addition salts and quaternary ammonium derivatives. The acid addition salts may be obtained by the action of acids on the iminodibenzyl derivatives in appropriate solvents. As organic solvents there may be used, for example, alcohols, ethers, ketones or chlorinated hydrocarbons; water may advantageously be used as an inorganic solvent. The salt which is formed is precipitated, if necessary after concentration of its solution, and is separated by filtration or decantation. The quaternary ammonium derivatives may be obtained by the action of esters on the iminodibenzyl derivatives, optionally in an organic solvent, at room temperature or, more rapidly, with gentle heating.

The new iminodibenzyl derivatives of Formula I may be purified by physical methods such as distillation, crystallisation or chromatography, or by chemical methods such as the formation of salts, crystallisation of the salts and decomposition of them in an alkaline medium. In the said chemical method the nature of the anion of the salt is immaterial, the only requirement being that the salt must be well-defined and readily crystallisable.

The new iminodibenzyl derivatives of the present invention possess valuable pharmacodynamic properties; in particular, they are psychotonics, decontracturants, e.g. centrally active muscle relaxants, anti-Parkinsonians, anti-emetics and antihistaminics. Compounds of the present invention which possess outstanding utility in the aforesaid respects are those in which the hydrocarbon chain A is $-(CH_2)_2-$ or $-(CH_2)_3-$. Individual compounds of importance are 5-(3-4'-β-hydroxyethyl-1'-piperazinylpropyl)iminodibenzyl, 5-(2-4'-β-hydroxyethyl-1'-piperazinylethyl)iminodibenzyl, 5-(3-4'-β-hydroxyethoxyethyl-1'-piperazinylpropyl)iminodibenzyl, 3,7-dichloro-5-(3-4'-β-hydroxyethyl-1' - piperazinylpropyl)iminodibenzyl, 3,7-dichloro-5-(2-4'-β-hydroxyethyl - 1'-piperazinylethyl) iminodibenzyl, 3,7-dichloro-5-(3-4'-β-hydroxyethoxyethyl-1'-piperazinylpropyl)iminodibenzyl, 3,7-dichloro-5-(2-4'-β-hydroxyethoxyethyl-1' - piperazinylethyl)iminodibenzyl, 5-(2-4'-β - hydroxyethoxyethyl-1'-piperazinylethyl)iminodibenzyl and 5-(3-4'-acetoxyethyl-1'-piperazinylpropyl)-iminodibenzyl.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, oxalates, tartrates, methanesulphonates, ethanedisulphonates, chlorotheophyllinates, theophylline-acetates, salicylates, phenolphthaleinates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl chloride, bromide or iodide) or other reactive esters, e.g. methyl or ethyl sulphate or toluene-p-sulphonate.

The following examples illustrate the invention.

*Example I*

A mixture of 5-(3-chloropropyl)iminodibenzyl (43 g.), 1-(2-hydroxyethyl)piperazine (104 g.), pure dry sodium iodide (24 g.) and methylethyl ketone (800 cc.) is boiled for 24 hours under reflux with agitation. After cooling, the mineral salts are filtered off and the solvent is distilled off to dryness in vacuo. The residue is treated with benzene (500 cc.) and water (500 cc.). The benzene layer is decanted and the aqueous phase is again extracted with benzene (2 x 250 cc.). The combined benzene extracts are washed with water (3 x 600 cc.) and then extracted with N hydrochloric acid (320 cc., 160 cc. and 160 cc. successively). The combined hydrochloric acid extracts are washed with benzene (100 cc.) and made alkaline with sodium hydroxide solution (d=1.33, 70 cc.) and the base precipitates as an oil which then crystallises rapidly. The crystals are filtered off, washed with water on the filter and dried overnight in vacuo over sulphuric acid. There is thus obtained 5-(3-4'-β-hydroxyethyl-1'-piperazinylpropyl)iminodibenzyl (48 g.), the dimaleate of which, prepared in ethanol, melts at 191–193° C.

The 5-(3-chloropropyl)iminodibenzyl used as starting material is prepared by chlorination with thionyl chloride in benzene in the presence of pyridine of 5-(3-hydroxypropyl)iminodibenzyl (B.P. 165–175° C./0.2 mm. Hg), itself obtained by the condensation of 2-chloropropoxytetrahydropyran with iminodibenzyl in xylene in the presence of sodamide followed by hydrolysis with hydrochloric acid in ethanol of the 5-(3-2'-tetrahydropyranyloxypropyl)-iminodibenzyl formed.

*Example II*

A solution of 5-(2-toluene-p-sulphonyloxyethyl)iminodibenzyl (8.35 g.) and 1-(2-hydroxyethyl)piperazine (8.2 g.) in anhydrous toluene (50 cc.) is boiled under reflux for 4 hours. After cooling, distilled water (75 cc.) is added, the mixture is agitated for 5 minutes and the aqueous layer is then decanted. The toluene solution is again washed with distilled water (50 cc.) and then extracted with N hydrochloric acid (40 cc.) followed by 0.1 N hydrochloric acid (40 cc.). The hydrochloric acid extracts are combined, washed with ether (50 cc.) and then made alkaline to phenolphthalein with sodium hydroxide (d=1.33). The base which separates is extracted with chloroform (50 cc.) and the chloroform solution is dried over anhydrous sodium sulphate and then evaporated to dryness in vacuo. The residue is crystallised from ethanol (60 cc.) and there is obtained 5-(2-4'-β-hydroxyethyl-1'-piperazinylethyl)iminodibenzyl (4.9 g.), M.P. 148° C.

The initial 5-(2-toluene-p-sulphonyloxyethyl)iminodibenzyl (M.P. 126–128° C.) is prepared by the action of toluene-p-sulphonyl chloride upon 5-(2-hydroxyethyl)-iminodibenzyl in anhydrous pyridine.

The 5-(2-hydroxyethyl)iminodibenzyl is prepared as follows:

A solution of iminodibenzyl (36.9 g.) in anhydrous toluene (200 cc.) is heated to 80° C. and then treated with sodamide (8.6 g.) and boiled under reflux. A solution of 1-chloro-2-tetrahydropyranyloxyethane (36.2 g.) in anhydrous toluene (50 cc.) is then added over 1 hour 40 minutes. Boiling is then continued for 6 hours and after cooling, distilled water (150 cc.) is added. After 5 minutes agitation the aqueous layer is decanted. The toluene solution is treated with ethanol (1 litre) and hydrochloric acid (d=1.19, 150 cc.) diluted to 20%. After standing for 2 hours at 20° C., the mixture is evaporated to dryness in vacuo and the residue is dissolved in chloroform (350 cc.) and ethanol (60 cc.). This solution is washed with water (500 cc. in 4 lots) and then dried over anhydrous sodium sulphate. The solvent is evaporated and the residue is distilled in vacuo giving 5-(2-hydroxyethyl)iminodibenzyl (26 g.) (B.P. 185–200° C./0.6 mm. Hg).

*Example III*

A solution of 5-(3-toluene-p-sulphonyloxy)iminodibenzyl (85 g.) and 1-(2-hydroxyethyl)piperazine (81 g.) in anhydrous toluene (500 cc.) is boiled under reflux for 4 hours. After cooling, distilled water (700 cc.) is added and the aqueous layer is decanted. The toluene solution is washed with distilled water (500 cc.) and then extracted with N hydrochloric acid (750 cc.). The hydrochloric acid solution is made alkaline to phenolphthalein with sodium hydroxide solution (d=1.33) and the base which separates is extracted with chloroform (400 cc.). The chloroform solution is dried over anhydrous sodium sulphate and then evaporated to dryness in vacuo to give 5-(3 - 4' - β - hydroxyethyl-1'-piperazinylpropyl)iminodibenzyl (76 g.), the dihydrochloride of which, crystallised from ethanol, melts at about 225° C.

The initial 5-(3-toluene-p-sulphonyloxypropyl)iminodibenzyl is prepared as follows:

A solution of 5-(3-hydroxypropyl)iminodibenzyl (94 g.) in anhydrous pyridine (430 cc.) is cooled to +3° C. in ice water. Toluene-p-sulphonyl chloride (71 g.) is added over 15 minutes, the mixture is left to stand for 18 hours at about 0° C. and ice water (2 litres) is then added. The product crystallises and the crystals are filtered off, washed with ice water (1 litre) and then dried in vacuo at 45° C. On crystallisation from ethanol (350 cc.) there is obtained 5-(3-toluene-p-sulphonyloxypropyl)iminodibenzyl (85 g.), M.P. 100–102° C.

*Example IV*

Proceeding as in Example III but commencing with 5-(3-toluene-p-sulphonyloxypropyl)iminodibenzyl (16 g.) and 1-(2-hydroxyethoxyethyl)piperazine (20.35 g.), there is obtained 5 - (3-4'-β-hydroxyethoxyethyl-1'-piperazinylpropyl)iminodibenzyl (15.6 g.), the hydrochloride of which, crystallised from ethanol, melts at about 215° C.

*Example V*

Proceeding as in Example III but commencing with 3,7-dichloro - 5 - (3 - toluene-p-sulphonyloxypropyl)iminodibenzyl (19 g.) and 1-(2-hydroxyethyl)piperazine (15.6 g.), there is obtained 3,7-dichloro-5-(3-4'-β-hydroxyethyl-1'-piperazinylpropyl)iminodibenzyl (10.3 g.), the dihydrochloride of which, crystallised from ethanol, melts at about 205° C.

The initial 3,7-dichloro-5 - (3 - toluene-p-sulphonyloxypropyl)iminodibenzyl is prepared by the action of toluene-p-sulphonyl chloride upon 3,7 - dichloro - 5 - (3-hydroxypropyl)iminodibenzyl (B.P. 215–230° C./0.6 mm. Hg) which is obtained by the condensation in toluene in the presence of sodamide of 1-chloro-3-tetrahydropyranyloxypropane with 3,7-dichloroiminodibenzyl followed by hydrolysis with hydrochloric acid in ethanol of the 3,7-dichloro - 5 - (3-tetrahydropyranyloxypropyl)iminodibenzyl formed.

*Example VI*

Proceeding as in Example III but commencing with 3,7 - dichloro - 5 - (2 - toluene - p - sulphonyloxyethyl)iminodibenzyl (18.5 g.) and 1-(2-hydroxyethyl)piperazine (10.4 g.), there is obtained 3,7-dichloro-5-(2-4'-β-hydroxyethyl-1'-piperazinylethyl)iminodibenzyl (11.8 g.), the bis(methanesulphonate) of which, crystallised from ethanol, melts at 250–252° C.

The initial 3,7-dichloro-5-(2-toluene-p-sulphonyloxyethyl)iminodibenzyl (M.P. 110–112° C.) is prepared by the action of toluene-p-sulphonyl chloride upon 3,7-dichloro - 5 - (2 - hydroxyethyl)iminodibenzyl (B.P. 222–230° C./0.5 mm. Hg) itself obtained by condensation of 1-chloro-2-tetrahydropyranyloxyethane with 3,7-dichloroiminodibenzyl in toluene in the presence of sodamide followed by hydrolysis with hydrochloric acid in ethanol of the 3,7-dichloro-5-(2-tetrahydropyranyloxyethyl) iminodibenzyl formed.

*Example VII*

Proceeding as in Example III but commencing with 3,7 - dichloro - 5 - (3 - toluene - p - sulphonyloxypropyl)iminodibenzyl (19 g.) and 1-(β-hydroxyethoxyethyl)piperazine (20.9 g.), there is obtained 3,7-dichloro- 5 - (3 - 4' - β - hydroxyethoxyethyl - 1' - piperazinylpropyl)iminodibenzyl (10.8 g.), the dihydrochloride of which, crystallised from ethanol, melts at 183–185° C.

*Example VIII*

Proceeding as in Example III but commencing with 3,7-dichloro - 5 - (2 - toluene - p - sulphonyloxyethyl)-iminodibenzyl (18 g.) and 1-(β-hydroxyethoxyethyl)piperazine (14 g.), there is obtained 3,7-dichloro-5-(2-4'-β - hydroxyethoxyethyl - 1' - piperazinylethyl)iminodibenzyl (18.4 g.), the dihydrochloride of which, crystallised from ethanol, melts at about 220° C.

*Example IX*

Proceeding as in Example III but commencing with 5 - (2 - toluene - p - sulphonyloxyethyl)iminodibenzyl (8.35 g.) and 1-(2-hydroxyethyl)piperazine (8.2 g.), there is obtained 5-(2-4'-β-hydroxyethyl-1'-piperazinylethyl)iminodibenzyl (4.9 g.), M.P. 148° C.

The initial 5-(2-toluene-p-sulphonyloxyethyl)iminodibenzyl (M.P. 126–128° C.) is prepared by the action of toluene-p-sulphonyl chloride upon 5-(2-hydroxyethyl)iminodibenzyl (B.P. 185–200° C./0.6 mm. Hg) itself obtained by the condensation of 1-chloro-2-tetrahydropyranyloxyethane with iminodibenzyl in toluene in the presence of sodamide followed by hydrolysis with hydrochloric acid in ethanol of the 5-(2-tetrahydropyranyloxyethyl)-iminodibenzyl formed.

*Example X*

A solution of 5-(2-toluene-p-sulphonyloxyethyl)iminodibenzyl (8.05 g.) and 1-(β-hydroxyethoxyethyl)piperazine (7 g.) in anhydrous toluene (50 cc.) is boiled under reflux for 4 hours. After cooling, distilled water (50 cc.) is added, the aqueous layer is decanted and the toluene solution is washed with distilled water (100 cc.) and then extracted with N hydrochloric acid (60 cc.). The hydrochloric acid solution is made alkaline to phenolphthalein with sodium hydroxide solution ($d=1.33$) and the base which separates is extracted with chloroform (100 cc.). The chloroform solution is dried over anhydrous sodium sulphate and then evaporated to dryness in vacuo. There is thus obtained 5-(2-4'-β-hydroxyethoxyethyl - 1' - piperazinylethyl)iminodibenzyl (7.9 g.), the dihydrochloride of which, crystallised from ethanol, melts at about 210° C.

*Example XI*

Proceeding as in Example X but commencing with 5 - (4 - toluene - p - sulphonyloxybutyl)iminodibenzyl (21 g.) and 1-(β-hydroxyethoxyethyl)piperazine (17.5 g.), there is obtained 5-(4-4'-β-hydroxyethoxyethyl-1'-piperazinylbutyl)iminodibenzyl (17.4 g.), the dihydrochloride of which, crystallised from ethanol, melts at about 200° C.

The initial 5-(4-toluene-p-sulphonyloxybutyl)iminodibenzyl is prepared by the action of toluene-p-sulphonyl chloride upon 5-(4-hydroxybutyl)iminodibenzyl (B.P. 215° C./0.4 mm. Hg), itself obtained by the condensation of 1-chloro-4-tetrahydropyranyloxybutane with iminodibenzyl in toluene in the presence of sodamide followed by hydrolysis with hydrochloric acid in ethanol of the 5 - (4 - tetrahydropyranyloxybutyl)iminodibenzyl formed.

*Example XII*

Proceeding as in Example X but commencing with 5 - (4 - toluene - p - sulphonyloxybutyl)iminodibenzyl (21 g.) and 1-(β-hydroxyethyl)piperazine (13 g.), there is obtained 5-(4-4'-β-hydroxyethyl-1'-piperazinylbutyl)-iminodibenzyl (17.35 g.), the dihydrochloride of which, crystallised from ethanol, melts at about 225° C.

*Example XIII*

Proceeding as in Example X but commencing with 5-(2 - toluene - p - sulphonyloxypropyl)iminodibenzyl (20.4 g.) and 1-(β-hydroxyethoxyethyl)piperazine (17.5 g.), there is obtained 5-(2-4'-β-hydroxyethoxyethyl-1'-piperazinylpropyl)iminodibenzyl (15.6 g.), the dihydrochloride of which, crystallised from ethanol, melts at about 190° C.

The initial 5-(2-toluene-p-sulphonyloxypropyl)iminodibenzyl is prepared by the action of toluene-p-sulphonyl chloride upon 5-(2-hydroxypropyl)iminodibenzyl (B.P. 188–198° C./0.6 mm. Hg) which is obtained by the condensation of 1 - chloro - 2 - tetrahydropyranyloxypropane with iminodibenzyl in toluene in the presence of sodamide followed by the hydrolysis with hydrochloride acid in ethanol of the 5-(2-tetrahydropyranyloxypropyl)iminodibenzyl formed.

*Example XIV*

Proceeding as in Example X but commencing with 5-(2 - toluene - p - sulphonyloxypropyl)iminodibenzyl (20.4 g.) and 1-(β-hydroxyethyl)piperazine (13 g.), there is obtained 5-(2-4'-β-hydroxyethyl-1'-piperazinylpropyl)iminodibenzyl (13.18 g.), the dihydrochloride of which, crystallised from ethanol, melts at about 210° C.

*Example XV*

A solution of 5-(3-toluene-p-sulphonyloxy-2-methylpropyl)iminodibenzyl (23.2 g.) and 1-(β-hydroxyethoxyethyl)piperazine (29 g.) in anhydrous toluene (200 cc.) is boiled for 4 hours under reflux. After cooling, distilled water (100 cc.) is added, the aqueous layer is decanted and the toluene solution is washed with distilled water (200 cc.) and then extracted with N hydrochloric acid (150 cc.). The hydrochloric acid solution is made alkaline to phenolphthalein with sodium hydroxide solution ($d=1.33$). The base which separates is extracted with chloroform (100 cc.) and the chloroform solution is dried over anhydrous sodium sulphate and then evaporated to dryness in vacuo. After crystallisation of the residue from petroleum ether (B.P. 70–120° C.) (125 cc.), there is obtained 5-(3-4'-β-hydroxyethoxyethyl-1'-piperazinyl-2-methylpropyl)iminodibenyl (17.95 g.), M.P. 102–103° C.

The initial 5-(3-toluene-p-sulphonyloxy-2-methylpropyl)iminodibenzyl is prepared by the action of toluene-p-sulphonyl chloride upon 5-(3-hydroxy-2-methylpropyl)iminodibenzyl (B.P. 190–200° C./0.6 mm. Hg) which is obtained by the condensation of 1-chloro-2-methyl-3-tetrahydropyranyloxypropane with iminodibenzyl in toluene in the presence of sodamide followed by the hydrolysis with hydrochloric acid in ethanol of the 5-(3 - tetrahydropyranyloxy-2-methylpropyl)iminodibenzyl formed.

*Example XVI*

A solution of 5-(3-piperazinyl-2-methylpropyl)iminodibenzyl (9 g.), ethylene chlorhydrin (2.25 g.) and anhydrous triethylamine (2.8 g.) in toluene (10 cc.) is boiled under reflux for 5 hours. After cooling, toluene (10 cc.) and distilled water (20 cc.) are added and, after 5 minutes agitation, the aqueous layer is decanted. The toluene solution is extracted with N hydrochloric acid (100 cc.) and the hydrochloric acid solution is washed with ether (40 cc.) and then made alkaline to phenolphthalein with sodium hydroxide solution ($d=1.33$, 10 cc.). The base which separates is extracted with chloroform (100 cc.) and the chloroform solution is dried over anhydrous sodium sulphate and then evaporated to dryness in vacuo. On crystallisation of the residue from "Essence C" (150 cc.), there is obtained 5-(3,4'-β-hydroxyethyl-1'-piperazinyl - 2 - methylpropyl)iminodibenzyl (4.8 g.), M.P. 102–103° C.

The initial 5-(3 - piperazinyl-2-methylpropyl)iminodibenzyl (B.P. 225–265° C./0.8 mm. Hg) is prepared by the condensation of 1-acetyl-4-(3-chloro - 2 - methylpropyl)piperazine (B.P. 126–127° C./0.25 mm. Hg) with iminodibenzyl in toluene in the presence of sodamide followed by deacetylation of the product by boiling with dilute hydrochloric acid.

Example XVII

A solution of 5 - (3 - 4'-β-hydroxyethyl-1'-piperazinylpropyl)iminodibenzyl (16 g.) in acetic anhydride (24 cc.) and anhydrous pyridine (120 cc.) is heated for 6 hours on a water-bath. After cooling, the solvents are distilled off to dryness in vacuo, the residue is dissolved in ether (250 cc.) and the ethereal solution obtained is washed successively with water (100 cc.), a 5% aqueous solution (200 cc.) of sodium bicarbonate and water (100 cc.), and extracted with N hydrochloric acid (90 cc., 50 cc. and 40 cc. successively). The combined hydrochloric acid extracts are washed with ether (50 cc.), decolourised with charcoal and then made alkaline with sodium hydroxide solution (d=1.33, 20 cc.). The oily base which precipitates is extracted with ether (250 cc. in 4 lots) and the combined ethereal extracts are washed with water. After distillation of the ether, there is obtained 5 - (3-4'-acetoxyethyl-1'-piperazinylpropyl)iminodibenzyl (17.1 g.), the dimaleate of which, prepared in ethanol, melts at 198–199° C.

The present invention further includes within its scope pharmaceutical compositions which comprise one or more compounds of general Formula I or their acid addition or quaternary ammonium salts together with a significant amount of a pharmaceutical carrier. The invention includes especially such compositions made up for oral, rectal, or parenteral administration.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the preparations should normally contain between 0.1 and 10 mg. per kilogram of weight of the animal to be treated.

The following examples illustrate pharmaceutical compositions according to the invention.

Example XVIII

Tablets are prepared containing:

|  | G. |
|---|---|
| 5 - (3-4'-β-hydroxyethyl - 1' - piperazinylpropyl)iminodibenzyl | 0.025 |
| Starch | 0.142 |
| Finely powdered silica | 0.03 |
| Magnesium stearate | 0.003 |

Example XIX

A solution is prepared having the following composition:

| | |
|---|---|
| 5-(3-4'-β-hydroxyethyl - 1' - piperazinylpropyl)iminodibenzyl _____g__ | 1.25 |
| 1 N methanesulphonic acid _____cc__ | 3.41 |
| Neutral anhydrous sodium sulphite _____g__ | 0.05 |
| Ascorbic acid _____g__ | 0.1 |
| Sodium chloride _____g__ | 0.65 |
| Water, quantity sufficient to make 100 cc. | |

This solution is distributed in 2 cc. ampoules which are sealed under nitrogen. The ampoules are then sterilised at 120° C. for 20 minutes.

We claim:

1. A member of the class consisting of iminodibenzyl derivatives of the formula:

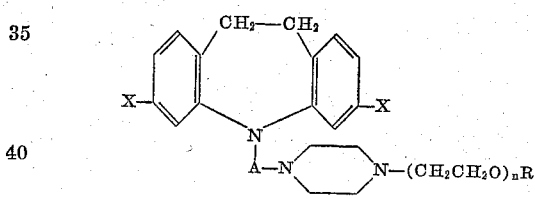

wherein A represents a saturated aliphatic hydrocarbon group containing 2 to 4 carbon atoms with at least two carbon atoms between the nitrogen atom of the iminodibenzyl nucleus and that of the piperazine nucleus, the symbols X are the same and represent a member of the class consisting of hydrogen and halogen atoms, n is an integer selected from 1 and 2, R represents a member of the class consisting of hydrogen, lower alkanoyl, carbamoyl, N-(lower alkyl) carbamoyl, and N-di(lower alkyl) carbamoyl groups, and their non-toxic acid addition salts.

2. 5-(3-4'-β-hydroxyethyl - 1'-piperazinylpropyl)iminodibenzyl.

3. 5-(3-4'-β-hydroxyethoxyethyl - 1'-piperazinylpropyl)iminodibenzyl.

4. 3,7-dichloro-5-(3-4'-β-hydroxyethyl - 1'-piperazinylpropyl)iminodibenzyl.

5. 3,7-dichloro-5-(3-4'-β-hydroxyethoxyethyl - 1'-piperazinylpropyl)iminodibenzyl.

6. 5-(3 - 4'-acetoxyethyl - 1' - piperazinylpropyl)iminodibenzyl.

References Cited in the file of this patent

UNITED STATES PATENTS 2,813,857    Schindler _____ Nov. 19, 1957